(12) United States Patent
Sacks et al.

(10) Patent No.: US 10,868,885 B2
(45) Date of Patent: *Dec. 15, 2020

(54) METHOD FOR GENERATING SOCIAL NETWORK ACTIVITY STREAMS

(71) Applicant: Yammer, Inc., San Francisco, CA (US)

(72) Inventors: David Oliver Sacks, San Francisco, CA (US); Adam Marc Pisoni, San Francisco, CA (US); Kris Branson Gale, San Francisco, CA (US); James Robert Patterson, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,976

(22) Filed: Jul. 2, 2019

(65) Prior Publication Data

US 2020/0007646 A1     Jan. 2, 2020

Related U.S. Application Data

(63) Continuation of application No. 15/154,946, filed on May 14, 2016, now Pat. No. 10,348,853, which is a continuation of application No. 13/598,485, filed on Aug. 29, 2012, now Pat. No. 9,363,325.

(51) Int. Cl.
| | |
|---|---|
| *G06F 15/16* | (2006.01) |
| *H04L 29/08* | (2006.01) |
| *G06Q 10/10* | (2012.01) |
| *H04W 4/21* | (2018.01) |

(52) U.S. Cl.
CPC ......... *H04L 67/306* (2013.01); *G06Q 10/10* (2013.01); *H04L 67/02* (2013.01); *H04L 67/22* (2013.01); *H04W 4/21* (2018.02)

(58) Field of Classification Search
CPC ....... H04L 67/306; H04L 67/02; H04L 67/22; H04W 4/21; G06Q 10/10
USPC ........................................................ 709/206
See application file for complete search history.

(56) References Cited

U.S. PATENT DOCUMENTS

| | | | |
|---|---|---|---|
| 9,143,601 | B2 | 9/2015 | Padmanabhan et al. |
| 9,602,605 | B2 | 3/2017 | Wang et al. |
| 9,871,757 | B1 | 1/2018 | Reardon |
| 2013/0332308 | A1* | 12/2013 | Linden ............... G06Q 30/0631 705/26.7 |

OTHER PUBLICATIONS

Ko, et al., "Enabling Cross-Site Content Sharing between Social Networks", In Proceedings of the IEEE International Conference on Privacy, Security, Risk, Trust, and Social Computing, Oct. 9, 2011, pp. 493-496.

* cited by examiner

*Primary Examiner* — Alan S Chou

(57) ABSTRACT

A method for notifying users of an online social network of an activity performed within a web site that is external to the online social network by an individual who is a registered user of the online social network and the web site. The method comprises the steps of receiving a notification package from the external web site, the notification package including a notification message that describes the activity performed, parsing the notification package to extract a list of recipients, each of whom is to receive the notification message, and issuing the notification message to each of the recipients.

20 Claims, 5 Drawing Sheets

METHOD FOR GENERATING SOCIAL NETWORK ACTIVITY STREAMS

CROSS-REFERENCE TO RELATED APPLICATIONS

This application is a continuation of and claims priority to U.S. patent application Ser. No. 15/154,946, entitled "METHOD FOR GENERATING SOCIAL NETWORK ACTIVITY STREAMS," filed on May 14, 2016 and issuing on Jul. 9, 2019 as U.S. Pat. No. 10,348,853 which is a continuation of and claims priority to U.S. Pat. No. 9,363,325, entitled "METHOD FOR GENERATING SOCIAL NETWORK ACTIVITY STREAMS," issued on Jun. 7, 2016, both of which are hereby incorporated by reference herein, in their entirety.

BACKGROUND

Recent trends indicate a considerable increase in the amount of content being shared over the Internet. One popular approach for sharing content involves creating a new email, copying and pasting into the email a uniform resource locator (URL) link directed to a web page that includes the content, and then sending the email to one or more individuals. Though this approach is efficient in many aspects, there are also many drawbacks, which include, for example, incomprehensive or out-of-date email address books that limit deliverability of the shared content to intended recipients, spam filters erroneously flagging the email as spam, and the like. As a result, alternative approaches for sharing content have been developed.

One alternative approach involves sharing content via social network "posts." To post content within a social network, an individual accesses an interface through which he or she is able to create a new post that includes, for example, photos and videos (uploaded through the interface), or a link to a particular web page (by specifying a URL via the interface). In some cases, when the new post is directed to a web page, the provider of the social network visits the web page and extracts information from the web page for display within the post, e.g., an excerpt of text from the web page. This beneficially indicates to viewers of the post the safety and nature of the web page to which the URL is directed, which is a feature that is absent from the email-based approach described above.

One of the issues with the foregoing content sharing approaches is that they indirectly lead users to attempt sharing private URLs that may or may not be accessible by others. Consider, for example, a user who is logged into a photo storage web site and who attempts to share the URL "https://www.photo-website.com/user_123/photos", which is directed to a secure web page that displays a private gallery of the user's digital photographs. In this example, the photo storage web site, when receiving a request to access the web page to which the URL is directed, delivers the web page to the requestor only if the requestor has provided valid login information; otherwise, the photo storage web site returns an invalid web page notification to the requestor. As a result, most—if not all—of the recipients of the shared URL are unable to access the web page to which the URL is directed, since they likely do not (and should not) possess the user's credentials.

SUMMARY

One or more embodiments of the present invention provide a technique for notifying users of an online social network of an activity performed within a web site that is external to the online social network by an individual who is a registered user of the online social network and the external web site. The method includes the steps of receiving a notification package from the external web site, the notification package including a notification message that describes the activity performed on the external web site, parsing the notification package to extract a list of recipients within the social network, each of whom is to receive the notification message, and issuing the notification message to each of the recipients.

Further embodiments of the present invention include, without limitation, a non-transitory computer-readable storage medium that includes instructions that enable a processing unit to implement one or more aspects of the above methods.

BRIEF DESCRIPTION

DETAILED DESCRIPTION

As described in further detail herein, embodiments of the invention enable one or more members of a social network web site to be automatically notified when a member of the same social network web site performs a particular action within a web site that is external to the social network web site. As used herein, the member performing the particular action that triggers the automatic notification is referred to as the "actor" and the members who are notified are referred to as the "recipients." In the examples illustrated herein, the actor is a registered member with both the social network web site and the external web site and, therefore, is commonly known between the two, and the action that is performed on the external web site is not visible to a web crawler or through a URL that is directed to a web page within which the action is performed. Embodiments of the invention, however, may be implemented to enable the actor to seamlessly and automatically share via social network notifications his or her actions performed within the external web site. Embodiments of the invention eliminate cumbersome tasks that the actor would otherwise be required to execute in order to share such activities, e.g., manually creating a social network post for each activity performed within an external web site. Moreover, embodiments of the invention enable the actor to specify different sets of recipients within the social network web site who should receive notifications when a particular activity is performed within the external web site.

In order to implement the foregoing techniques, in one embodiment, the social network web site exposes an application programming interface (API) that enables the external web site to notify the social network web site when an actor executes a particular activity within the external web site. Specifically, when the external web site detects a particular activity performed by the actor, the external web site generates and populates a notification package—referred to herein as an "activity envelope"—and then transmits the activity envelope to the social network web site for processing. Upon receipt, the social network web site parses the activity envelope, and, based on the activity envelope and notification preferences of identified recipients within the social network, posts one or more notifications to one or more recipients within the social network.

Figure 1:
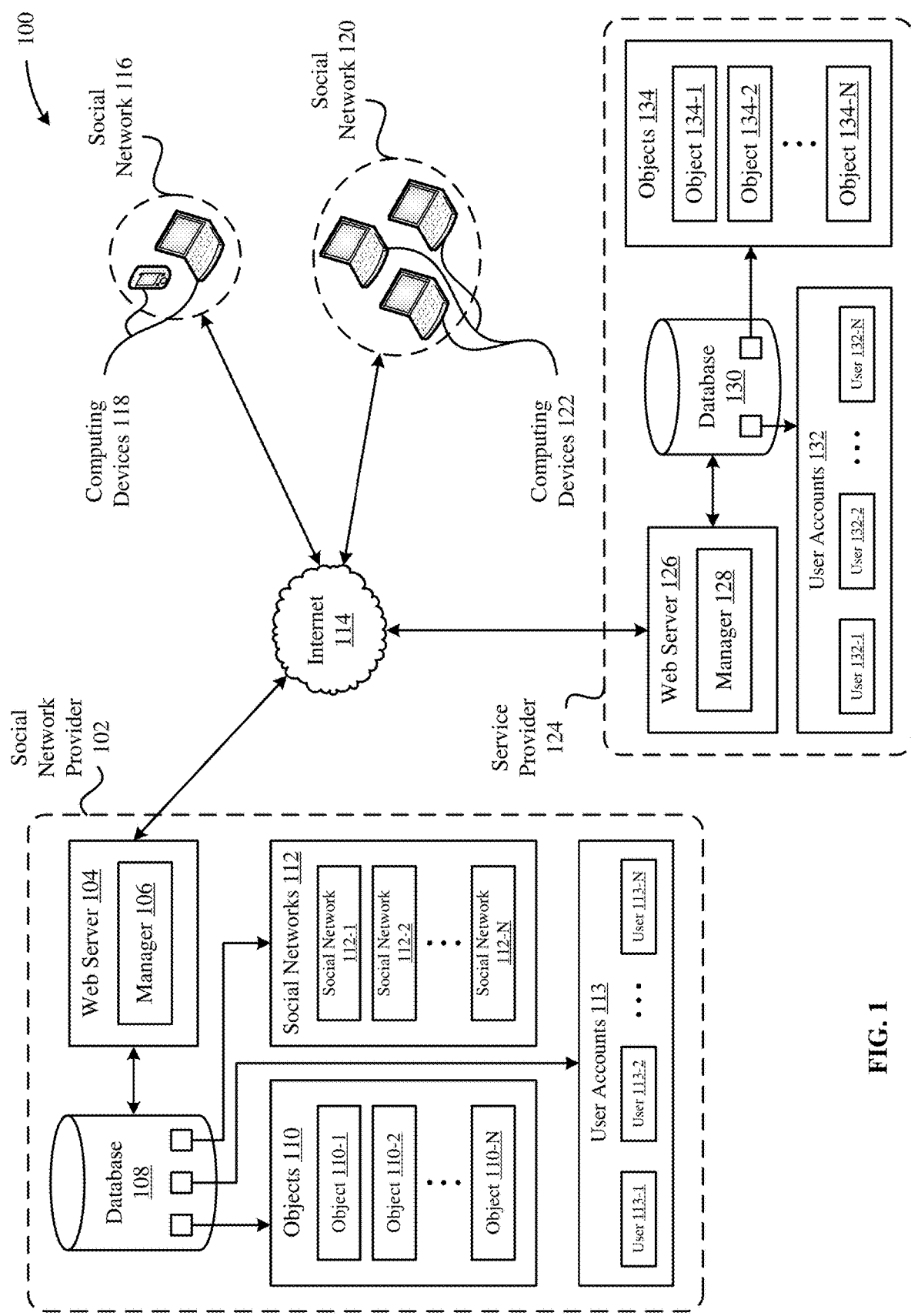
FIG. 1 illustrates a system that is configured to implement one or more embodiments of the present invention.

FIG. 1 illustrates a system 100 that is configured to implement one or more embodiments of the present invention. As shown, system 100 includes social network provider 102, which is an online service that manages social networks and communicates with computing devices over Internet 114. In one embodiment, social network provider 102 includes a web server 104 and a database 108, where web server 104 executes a manager 106 that communicates with database 108 and is configured to control the overall operation of social network provider 102. In one embodiment, database 108 is a relational database and, as illustrated in FIG. 1, is configured to store information related to objects 110, social networks 112, and user accounts 113, which are collectively used to implement the techniques described herein.

In the embodiment illustrated in FIG. 1, users access social network provider 102 via computing devices that are connected to Internet 114. In particular, users of computing devices 118 are members of a social network 116 and users of computing devices 122 are members of a social network 120. Only two social networks are shown in FIG. 1 to simplify the description, but in practice there may be a large number of social networks. It should be recognized that attributes of social networks, such as social network 116 and social network 120, are managed by manager 106. Social networks 116 and 120 are depicted in dotted circles to indicate the relationship between users of computing devices 118 (i.e., they belong to the same social network 116) and the relationship between users of computing devices 122 (i.e., they belong to the same social network 120).

As described in further detail herein, a social network is a collection of users and content generated by one or more users. Manager 106 isolates social networks from one another in order to create an environment where users registered in one social network have the ability to view content of other users registered within that social network—but do not have the ability to view content of users registered within other social networks. In one embodiment, each user is registered in a social network that is associated with the domain portion of the user's email address, such as in the social networks provided by Yammer, Inc. For example, in FIG. 1, users of computing devices 118 are members of social network 116 because they share the same email domain (e.g., joe@foo.com and bob@foo.com). Likewise, users of computing devices 122 are members of social network 120 because they share the same email domain. Thus, in this example, each social network is associated with a unique email domain.

Also included in system 100 is service provider 124, which represents the external web site described above—for example, an online document repository for managing electronic files—and is used by at least one user, known to social network provider 102, who is operating one of computing devices 118, 122. As shown, service provider 124 includes similar components as social network provider 102, e.g., a web server 126, a manager 128 and a database 130. Manager 128 is configured to communicate with database 130 and controls the overall operation of the external web site provided by service provider 124. As shown, database 130 stores objects 134 that represent data (e.g., electronic files) used by manager 128 to provide the online service. Database 130 also stores user accounts 132, and, in the example illustrated herein, at least one user account 132 is associated with an individual who also has a user account 113 within social network provider 102.

Figure 2:
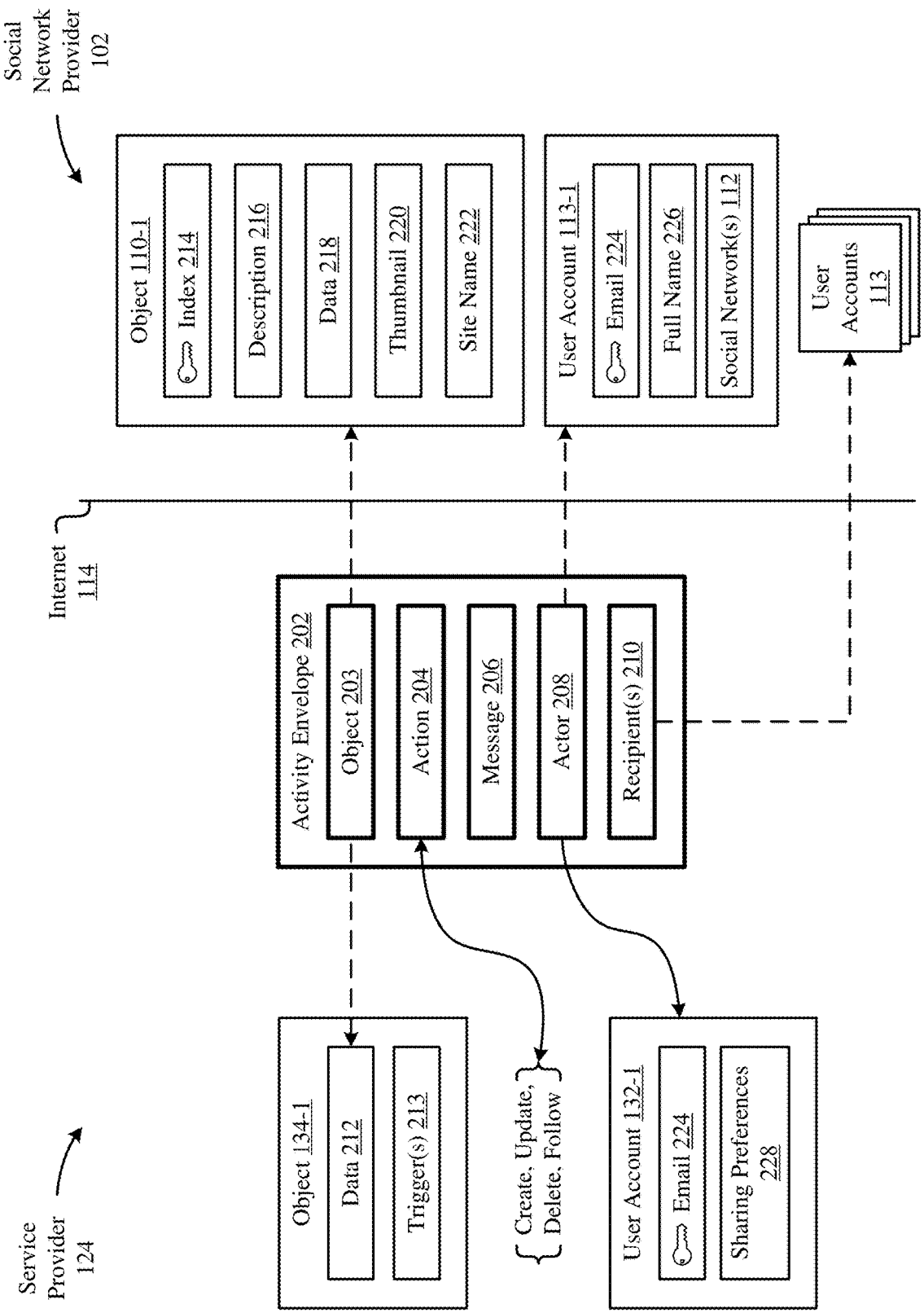
FIG. 2 is a block diagram that illustrates structures of data objects that may be used to implement one or more embodiments of the present invention.

FIG. 2 is a block diagram 200 that illustrates structures of data objects that may be used to implement one or more embodiments of the present invention. It should be noted that these structures are not limited to include only those properties illustrated in FIG. 2 or described herein, and may include additional properties associated with, for example, miscellaneous properties, creation times, update times, and the like. As shown, FIG. 2 includes an activity envelope 202, which, in the example described herein, is generated by service provider 124 and transmitted to social network provider 102 in response to an action performed on object 134-1 by a user, where the user is known to service provider 124 via user account 132-1 and the user is also known to social network provider 102 via user account 113-1. In one embodiment, the user is known to both service provider 124 and social network provider 102 through an attribute that is common between user account 132-1 and user account 113-1, such as an e-mail address that is stored in email 224.

In the example illustrated herein, object 134-1 is associated with data 212 and one or more triggers 213, where triggers 213 indicate to service provider 124 various conditions under which an action performed by the user on data 212 will cause an activity envelope 202 to be generated and transmitted to social network provider 102. In one embodiment, the manner in which activity envelopes 202 are generated and transmitted is controlled by sharing preferences 228 of the user, which are established in the following manner. First, service provider 124 provides an interface through which the user submits login credentials for his or her user account 113-1 with social network provider 102. In turn, service provider 124 accesses social network provider 102 on the user's behalf and extracts information associated with the user, e.g., friends of the user within the social network(s) managed by social network provider 102, along with social network groups that each encompasses a subset of the friends. Service provider 124 may also query the user in order to determine how the user prefers his or her activity within the external web site managed by service provider 124 to be posted within the social network managed by social network provider 102. For example, the user may specify that a notification should be posted within the social network any time he or she uploads a new object 134 to service provider 124.

When a condition indicated by one of the triggers 213 is satisfied (e.g., a digital image is uploaded to service provider 124), service provider 124 accesses an API published by social network provider 102 to generate activity envelope 202. Activity envelope 202 includes an object 203, which is configured according to a format that is understood by both social network provider 102 and service provider 124. An example of such a format is illustrated by object 110-1 in FIG. 2, which includes an index 214, a description field 216, data 218, a thumbnail 220, and site name 222. Upon receipt of activity envelope 202 by social network provider 102, social network provider parses activity envelope 202 to extract, among other items (i.e., action 204, message 206, actor 208 and recipients 210), object 203. Object 203 may be a new object to social network provider 102, in which case it is added as a new object 110 into database 108, or may instead refer to an existing object 110, e.g., object 110-1. This determination is made via index 214 of object 203, which is a primary key that may be used to refer object 203 to an existing object 110 stored in database 108. In some cases, service provider 124 may leave index 214 undefined, which indicates to social network provider 102 that object 203 should be added as a new object 110 into database 108. Description field 216 is text data that is used to describe the data entity encompassed by object 134-1, e.g., a filename "2011 Sales Goals.ppt" for a Microsoft PowerPoint file stored in data 212 of object 134-1. Data 218 is blob data that is used to store a copy of data 212, e.g., data that comprises the "2011 Sales Goals.ppt" file. Since object 203 is ultimately stored by social network provider 102 as an object 110, and includes a copy of data 212 (via data 218), data 212 can be made accessible to users of social network provider 102 (e.g., within a post) such that they do not need to visit the external web site managed by service provider 124 in order to access data 212. Thumbnail 220 is also blob data, and is generally used to store a thumbnail image generally related to object 134-1, e.g., a company logo of service provider 124 that manages object 134-1. Finally, site name 222 is text data that is used to describe a web site name of service provider 124, e.g., "Online Document Repository."

As also shown, activity envelope 202 includes an action 204, a message 206, an actor 208, and recipient(s) 210. Action 204 is used to indicate a type of action that is performed on object 134-1 (e.g., a request by the user to create, update, follow or delete object 134-1). A message 206 is text data that is used to describe why activity envelope 202 is being sent, e.g., "The file titled 'Earnings Report Q3 2011.xls' has been updated." Actor 208 refers to the user who requests service provider 124 to perform the action on object 134-1. Finally, recipient(s) 210 references one or more users (different than actor 208) via user accounts 113 who should receive a notification about the action performed on object 134-1.

Figure 3:
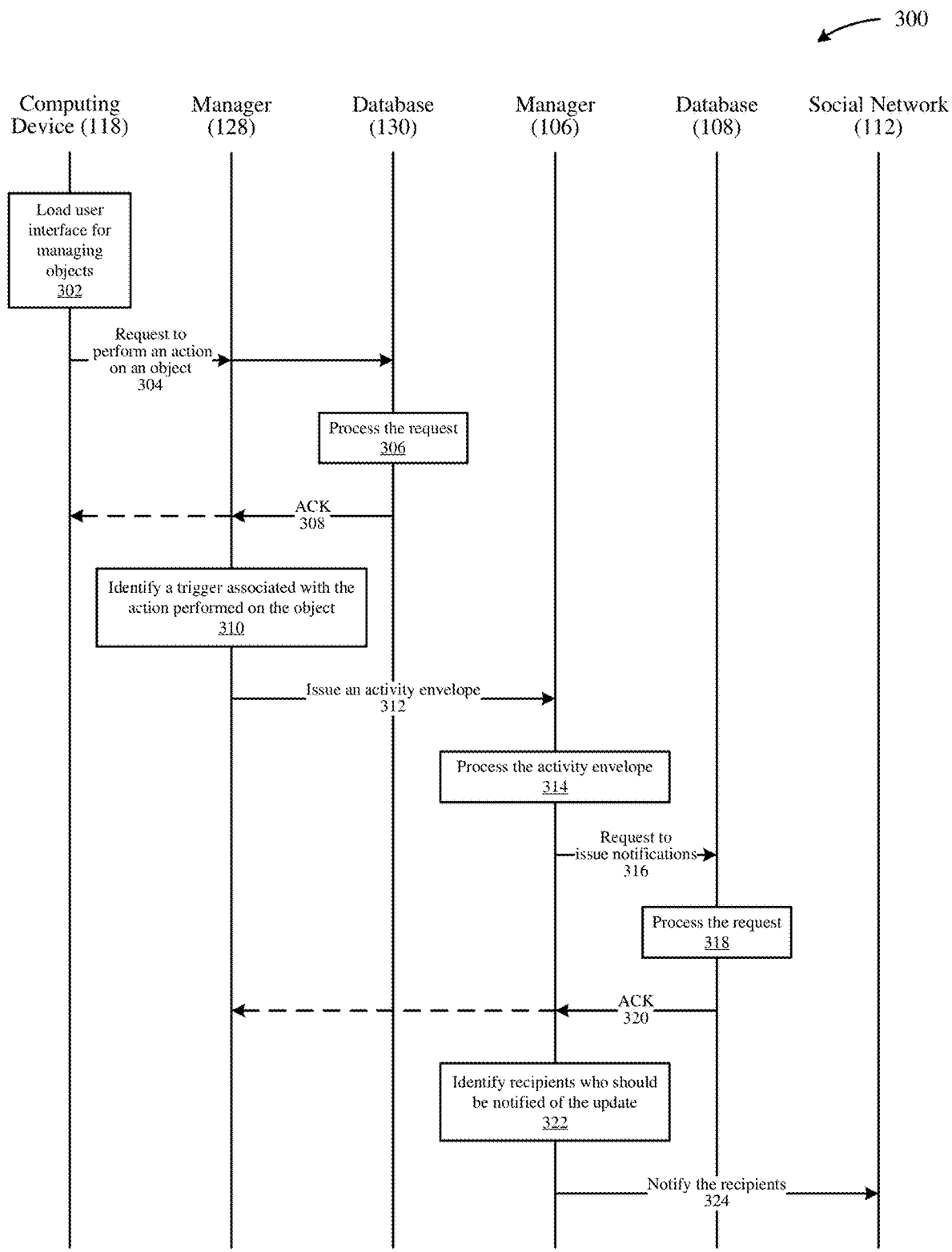
FIG. 3 is a sequence diagram that illustrates example operations for issuing notifications to one or more members of a social network in response to activity performed within an external web site by another member of the social network, according to one embodiment of the present invention.

FIG. 3 is a sequence diagram that illustrates example operations 300 for issuing notifications to one or more members of a social network in response to activity performed within an external web site by another member of the social network, according to one embodiment of the present invention. In particular, the operations of system 100 are shown in FIG. 3. While the example operations are depicted as being performed by the system 100 of FIG. 1, it is contemplated that embodiments of the invention may be performed by other suitable systems.

Step 302 is representative of operations that occur at a computing device 118, which, as described above, is operated by a user and communicates with service provider 124 via Internet 114. As shown, computing device 118 loads a user interface for managing objects 134, e.g., electronic files, under the example scenario where service provider 124 hosts an online document repository.

At step 304, computing device 118 transmits to manager 128 a request to perform an action (i.e., an action 204) on an object 134, e.g., object 134-1. One example includes uploading a new electronic file into the online document repository. Although not explicitly illustrated, manager 128 processes the request and forwards the request to database 130 in accordance with conventional web server/database configurations, which is well-understood by those having ordinary skill in the art.

At step 306, database 130 processes the request, i.e., writes the uploaded electronic file into a storage space, and then, at step 308, transmits to manager 128 an acknowledgement (ACK) message that indicates successful storage of the electronic file. As shown, manager 128 optionally forwards the ACK to computing device 118 to indicate to the user that the electronic file was successfully uploaded.

At step 310, manager 128 identifies a trigger (i.e., a trigger 213) associated with the activity (i.e., action 204) performed on object 134-1. In one embodiment, the trigger is implemented via database triggers that execute operations in response to a particular action performed on object 134-1, e.g., a first function when object 134-1 is created, a second function when object 134-1 is updated, a third function when object 134-1 is followed by a user, and a fourth function when object 134-1 is deleted. In general, each function is directed toward issuing activity envelope 202 that is generated in accordance with the action performed on object 134-1.

At step 312, manager 128 issues activity envelope 202. As described above in conjunction with FIG. 2, the various properties of activity envelope 202 are populated with data based on, for example, the user (i.e., actor 208) who requests to perform the action on object 134-1 at step 304, the type of action (i.e., action 204) that is requested/performed, the data type of object 134-1 (i.e., description 216), specific users (i.e., recipients 210) who should be notified of the action that is performed on object 134-1, and the like.

At step 314, manager 106 receives and processes activity envelope 202. In order to simplify the sequence diagram of FIG. 3, the various details pertaining to processing activity envelope 202 are described below in conjunction with FIG. 4. Accordingly, in FIG. 3, it is assumed that activity envelope 202 is deemed valid by manager 106, and, at step 316, manager 106 issues a request to database 108 to issue notifications based on the receipt of activity envelope 202. Continuing with the example described above at step 304, database 108, at step 318, processes the request by first writing the new electronic file into database 108. At step 320, database 108 issues an ACK that indicates that the new electronic file was successfully written into database 108. The ACK is received by manager 106, whereupon manager 106 optionally forwards the ACK to manager 128.

At step 322, manager 106 identifies recipients (i.e., user accounts 113) who should receive the notification. The identified recipients are primarily based on the recipient(s) 210 specified in activity envelope 202. For example, if one or more recipients are indicated by recipient(s) 210, then at step 324 manager 106 notifies those one or more recipients according to their notification preferences. Alternatively, if no recipients are indicated by recipient(s) 210, then at step 324 manager 106 identifies and notifies all users with whom actor 208 is associated, e.g., all friends of actor 208 within a social network of which actor 208 is a member.

Figure 4:
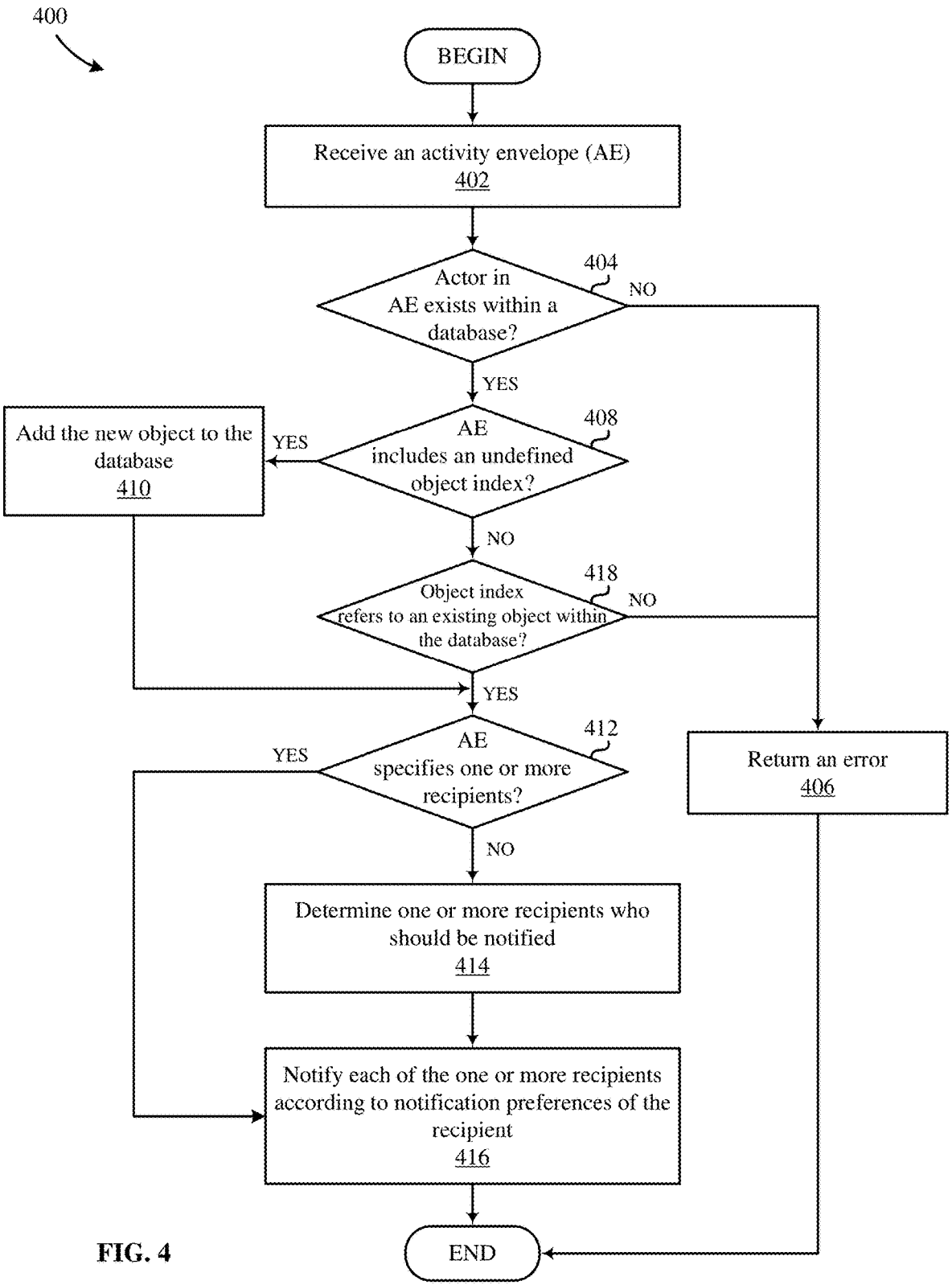
FIG. 4 is a flow diagram of a method for issuing notifications within a social network in response to activity performed within an external web site, according to or more embodiments of the invention.

FIG. 4 is a flow diagram of a method 400 for issuing one or more notifications within a social network in response to an activity performed within an external web site, according to one or more embodiments of the invention. In particular, method 400 provides details that supplement method steps 314-324 described above in conjunction with FIG. 3. As shown, the method 400 begins at step 402, where manager 106 receives activity envelope 202, which is generated and transmitted by service provider 124 according to the techniques described herein. At step 404, manager 106 determines whether activity envelope 202 specifies an actor 208 that exists within database 108. In one embodiment, manager 106 generates a query that causes database 108 to search for an email address 224 that is specified within activity envelope 202.

If, at step 404, manager 106 determines that actor 208 does not exist within database 108, then the method 400 proceeds to step 406 and returns an error. This error is returned since actor 208, who is not recognized by database 108, is foreign to social network provider 102 and therefore no action should be taken by social network provider 102 in response to receiving activity envelope 202. If, however, manager 106 determines that actor 208 is recognized by database 108, then the method 400 proceeds to step 408, where manager 106 determines whether index 214 within activity envelope 202 is undefined. In general, manager 106 determines that activity envelope 202 references a new object 110 when index 214 is undefined within activity envelope 202. Otherwise, if index 214 is defined within the activity envelope 202, then manager 106 attempts to look up a matching object 110 within database 108, the details of which are described below at step 418. If, at step 408, manager 106 determines that index 214 within activity envelope 202 is defined, then the method 400 proceeds to step 410.

At step 410, manager 106 adds the new object 110 to database 108. In one embodiment, database 108, upon adding the new object 110 to database 108, assigns an index 214 to the new object 110 and returns the index 214 to service provider 124. In turn, service provider 124 associates the index 214 and the object 134 on which the activity envelope 202 is based, e.g., object 134-1. In this way, any future activity envelopes 202 that are generated in response to actions performed on that object 134 may reference the index 214 and include only information that is relevant to the actions being performed on that object 134.

At step 412, manager 106 determines whether activity envelope 202 specifies one or more recipients 210. As previously described herein, in certain cases, service provider 124, when generating activity envelope 202, determines that the recipients who are chosen to receive a notification should be left to the discretion of social network provider 102. In general, when no recipients 210 are specified within activity envelope 202, social network provider 124 is configured to notify all users with whom actor 208 is associated. However, social network provider 124 may be configured to identify recipients 210 by referring to sharing preferences 228 of actor 208 and then sending out the notifications accordingly. For example, actor 208 may specify that only friends within particular social network groups, e.g., "Friends" and "Family", should receive notifications related to activity of actor 208 performed within the external web site managed by service provider 124.

Accordingly, if, at step 412, manager 106 determines that activity envelope 202 does not specify any recipients 210, then the method 400 proceeds to step 414, where manager 106 determines one or more recipients who should be notified. At step 416, manager 106 notifies each of the one or more recipients according to notification preferences of the recipient. For example, any of the determined one or more recipients may be permitted to remove any notifications related to updating objects 134 such that a notification is received only when objects 132 are created, followed or deleted.

Referring back now to step 412, if manager 106 determines that activity envelope 202 does in fact specify one or more recipients 210, then manager 106 executes step 416 and notifies the specified one or more recipients 210. Again, notification preferences of the one or more recipients 210 may override the delivery of the notification.

Referring back now to step 408, if manager 106 determines that index 214 within activity envelope 202 is undefined, then the method 400 proceeds to step 418. At step 418, manager 106 determines whether index 214 within activity envelope 202 refers to an object 110 that exists within database 108, e.g., object 110-1. If so, then the method 400 proceeds to step 412, whereupon the remaining method steps 400 are carried out according to the techniques described above. Otherwise, the method 400 proceeds to step 406, where manager 106 returns an error to service provider 124 since manager 106 would not issue notifications directed to an invalid object 110.

Figure 5:
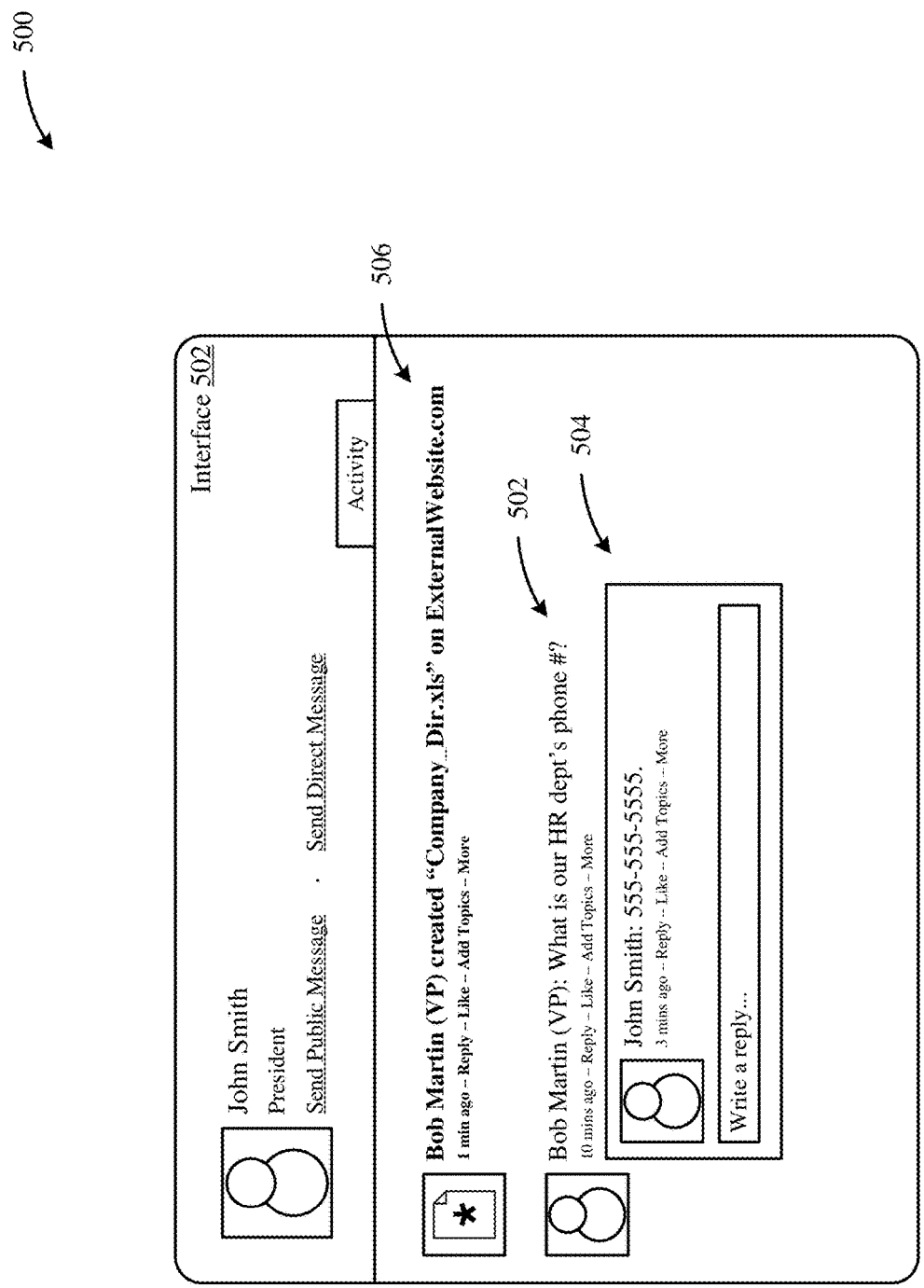
FIG. 5 is a conceptual diagram illustrating an example social network interface in which notifications of activity performed within an external web site are published, according to one embodiment of the present invention.

FIG. 5 is a conceptual diagram 500 illustrating an example social network interface 502 in which notifications of activity within an external web site managed by service provider 124 are published, according to one embodiment of the present invention. In one embodiment, social network interface 502 is a web page that is generated by social network provider 102 and viewed by a user named "John Smith" who is a member of a social network managed by social network provider 102 and is accessing the social network via a computing device 118. As shown, various posts are included in an activity feed that is displayed within social network interface 502, including an inter-social network post 502 made by "Bob Martin," a reply post 504 made by John Smith in response to the inter-social network post 502, and an automated post 506 generated by manager 106 in response to Bob Martin creating a document titled "Company_Dir.xls" on the external web site managed by service provider 124. In the example shown in FIG. 5, the external web site managed by service provider 124 is associated with the URL "ExternalWebsite.com".

One example sequence of events that may cause manager 106 to generate the automated post 506 involves Bob Martin linking his user account 113 (with social network provider 102) to his user account 132 (with service provider 124). This link can be established according a variety of techniques, e.g., service provider 124 presenting to Bob an interface in which he can provide his login credentials for his user account 113 with social network provider 102. In turn, social network provider 102 verifies Bob's user account 113 and transmits information back to service provider 124 that indicates to service provider 124 how an activity envelope 202 should be generated in response to Bob's activity within the external web site managed by service provider 124.

When Bob uploads the "Company_Dir.xls" file (i.e., a new object 134) to service provider 124 he may be permitted to establish triggers 213 that set forth specific conditions for controlling how subsequent actions performed to the "Company_Dir.xls" file are posted to the social network managed by social network provider 102. In one example, Bob is able to specify that only a particular subset of his friends (e.g., "Co-Workers") within the social network managed by social network provider 102 should receive an update when he makes a change to the "Company_Dir.xls" file. In this way, Bob is able to store both personal files and work-related files with service provider 124 while preventing any updates to personal files from being posted as notifications within the social network managed by social network provider 102.

In sum, embodiments of the invention advantageously enable one or more members of a social network web site to be automatically notified when a member of the same social network web site performs a particular action within a web site that is external to the social network web site. This allows the member to seamlessly and automatically share via social network notifications his or her actions performed within the external web site, which removes the conventional necessity of loading a social network interface and manually creating posts each time he or she performs an action within the external web site. Moreover, embodiments of the invention enable the member to specify different sets of recipients within the social network web site who should receive notifications when a particular activity is performed within the external web site.

Providing the above features advantageously enables the member to have a wide range of control over how his activity within the web site is published to the social network. Such control unlocks several benefits to the member, e.g., allowing the member to utilize the external web site for both work related activity and personal activity, while preventing any work-related activity from being published within his or her personal social network(s), and also preventing any personal activity from being published within his or her work social network(s). Another example involves a member—who frequently executes updates within an external web site—enabling only notifications related to "create" activity within the external web site and disabling all other notifications (i.e., notifications related to update, follow and delete) from being published within social networks, which beneficially prevents his or her coworkers and/or friends from receiving an overwhelming number of unnecessary update notifications.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

What is claimed is:

1. A method of notifying users of an online social network of an activity performed within an external web site that is external to the online social network by an individual who is a registered user of the online social network and the external web site, comprising:
   receiving a notification package from the external web site, the notification package including a notification message that describes the activity performed;
   parsing the notification package to extract a list of recipients, each of whom is to receive the notification message; and
   issuing the notification message to each of the recipients.

2. The method of claim 1, wherein the recipients are selected according to sharing preferences of the individual.

3. The method of claim 2, wherein the sharing preferences are stored by the external web site in a registered user profile of the individual.

4. The method of claim 1, wherein the list of recipients is selected from a set of users associated with the individual that is obtained by the external web site from the online social network.

5. The method of claim 1, wherein the activity is performed on a data object managed by the external web site.

6. The method of claim 1, wherein the notification package identifies a group and the list of recipients is extracted from a group identifier.

7. The method of claim 6, wherein the notification package includes a list of recipients.

8. A non-transitory computer-readable storage medium storing instructions that, when executed by a processor, cause a computer system to notify users of an online social network of an activity performed within an external web site that is external to the online social network by an individual who is a registered user of the online social network and the external web site, by performing the steps of:
   receiving a notification package from the external web site, the notification package including a notification message that describes the activity performed;
   parsing the notification package to extract a list of recipients, each of whom is to receive the notification message; and
   issuing the notification message to each of the recipients.

9. The non-transitory computer-readable storage medium of claim 8, wherein the recipients are selected according to sharing preferences of the individual.

10. The non-transitory computer-readable storage medium of claim 9, wherein the sharing preferences are stored by the external web site in a registered user profile of the individual.

11. The non-transitory computer-readable storage medium of claim 8, wherein the list of recipients is selected from a set of users associated with the individual that is obtained by the external web site from the online social network.

12. The non-transitory computer-readable storage medium of claim 8, wherein the activity is performed on a data object managed by the external web site.

13. The non-transitory computer-readable storage medium of claim 8, wherein the notification package identifies a group and the list of recipients is extracted from a group identifier.

14. The non-transitory computer-readable storage medium of claim 13, wherein the notification package includes a list of recipients.

15. A computer system for an online social network that is configured to notify users of the online social network of an activity performed within an external web site that is external to the online social network by an individual who is a registered user of the online social network and the external web site, comprising:
 a database that stores profiles of the users of the online social network, the profiles including a profile of the individual and identifiers of other users of the online social network who are indicated to be friends of the individual; and
 a processor programmed to receive a notification package from the external web site, parse the notification package to extract a list of recipients, each of whom is to receive a notification message, and issue the notification message to each of the recipients,
 wherein a number of the recipients is less than a number of the other users of the online social network who are indicated to be friends of the individual.

16. The computer system of claim 15, wherein the recipients are selected according to sharing preferences of the individual.

17. The computer system of claim 16, wherein the sharing preferences are stored by the external web site in a registered user profile of the individual.

18. The computer system of claim 15, wherein the notification package includes a notification message that describes the activity performed.

19. The computer system of claim 18, wherein the activity is performed on a data object managed by the external web site.

20. The computer system of claim 15, wherein the notification package includes a list of recipients.

* * * * *